(12) United States Patent
Mcgraw (10) Patent No.: US 12,181,778 B2
(45) Date of Patent: Dec. 31, 2024

(54) LIGHT MODIFIERS FOR PHOTOGRAPHY

(71) Applicant: Jeremy Mason Mcgraw, New Bern, NC (US)

(72) Inventor: Jeremy Mason Mcgraw, New Bern, NC (US)

( * ) Notice: Subject to any disclaimer, the term of this patent is extended or adjusted under 35 U.S.C. 154(b) by 0 days.

(21) Appl. No.: 18/281,397

(22) PCT Filed: Mar. 11, 2022

(86) PCT No.: PCT/US2022/019901
§ 371 (c)(1),
(2) Date: Sep. 11, 2023

(87) PCT Pub. No.: WO2022/192637
PCT Pub. Date: Sep. 15, 2022

(65) Prior Publication Data
US 2024/0152036 A1 May 9, 2024

Related U.S. Application Data

(60) Provisional application No. 63/160,386, filed on Mar. 12, 2021.

(51) Int. Cl.
*G03B 15/05* (2021.01)
*G03B 15/06* (2021.01)

(52) U.S. Cl.
CPC ............. *G03B 15/05* (2013.01); *G03B 15/06* (2013.01); *G03B 2215/0567* (2013.01); *G03B 2215/0575* (2013.01); *G03B 2215/0582* (2013.01)

(58) Field of Classification Search
CPC ...... G03B 2215/0539; G03B 2215/0567–0592
See application file for complete search history.

(56) References Cited

U.S. PATENT DOCUMENTS

| 5,077,640 | A | 12/1991 | Butler, Jr. |
| 6,709,121 | B1 | 3/2004 | Lowe et al. |
| 2008/0037275 | A1 | 2/2008 | Eblenkamp et al. |

OTHER PUBLICATIONS

PCT Search Report prepared for PCT/US2022/019901, mailed Jun. 29, 2022.

*Primary Examiner* — Jason M Han
(74) *Attorney, Agent, or Firm* — Jonathan F. Yates; Brannon Sowers & Cracraft PC (57) ABSTRACT

Light modification devices for photography, videography, or other image capturing systems which provide methods for diffusing and shaping light from flash lighting or continuous light sources to create a diffused 360 degree thin plane of light around a subject. The light modification devices are capable of producing lighting conditions that can accentuate raised textures and depth of a subject without casting hard shadows with minimal light seepage outside of the plane.

20 Claims, 8 Drawing Sheets

LIGHT MODIFIERS FOR PHOTOGRAPHY

CROSS-REFERENCE TO RELATED APPLICATION

The present application is a U.S. national application under 37 C.F.R. § 371 (b) of International Application Serial No. PCT/US2022/019901 filed Mar. 11, 2022, which claims priority under 35 USC § 119 (e) to U.S. Provisional Patent Application No. 63/160,386, filed on Mar. 12, 2021, the entire disclosures of which are incorporated herein by reference.

TECHNICAL FIELD

The present disclosure relates generally to lighting and, more particularly, to modifying the lighting of subjects for photography and other image capturing systems.

BACKGROUND

Photographers, videographers, and other artists use a variety of different devices and techniques for illuminating their subjects. When capturing the images of staged items in a studio, photographers often use a variety of diffusing light boxes and reflectors and other techniques to shape the light around a subject so as to minimize or control shadows. Typically, these techniques fall into three different categories. First, multiple light boxes may be set around the subject and adjusted to selectively add light to different areas until the desired lighting effect is achieved. Second, so called "light painting" techniques may be used to add focused, continuous light to selected areas of a subject to create highlights while a camera is set to a long exposure time. Third, the subject may be placed inside a translucent box called a light tent which is illuminated from the outside. Light tents can be used to create an even, flat light on a subject which minimizes shadows from all sides.

These existing methods all have drawbacks which limit their effectiveness under certain conditions. The use of multiple light boxes requires considerable investment in equipment and advanced understanding and experience in optics and lighting. Light painting requires less equipment and knowledge to achieve a desired result, but it only works in a dark room over long periods of time which means it cannot be used to freeze action. Light tents also require less skill to operate effectively than light boxes and can produce good results in less time than light painting, but light tents offer much less control over the final result. Some surfaces in the light tent will show on the surface of reflective objects and generally contrast and depth of textures of objects in the tent are minimized. What is needed is a light modification device and system which is fast, easy to use, portable, and offers good control of the lighting of a subject without the drawbacks of existing systems and techniques.

SUMMARY OF THE INVENTION

In one aspect, a light shaping or modification device includes a ring portion with a first wall and second wall joined by an inner wall and an outer wall to enclose a space. Reflectors and diffusers are within the enclosed space to distribute light from flash devices outside the ring portion, to be emitted as a thin plane of light through a window opening in the inner wall. Mounting structures are adapted to pivotably mount to the ring portion and to allow the mounting of a flash apparatus/device thereto. In another aspect, the light shaping device is collapsible.

In another aspect, a light shaping device includes a ring portion having a first wall and a second wall joined by an inner wall and an outer wall to enclose a space, where the first wall, second wall, and outer wall are opaque, and a translucent layer extends circumferentially around a center axis of the ring portion at a location that is radially inward of the outer wall. Two mounting structures having open or transparent portions, where one side of each mounting structure is mounted to the outer wall of the ring portion and the other side of each mounting structure includes a structure for mounting a flash device thereto and where the open or transparent portions of each mounting structure is mounted to the ring portion at an opening in the outer wall. A window opening in the inner wall extends circumferentially around the center axis, and a translucent diffuser layer is positioned radially inward of the window opening.

In still another aspect, light shaping device includes a structural ring portion having an upper ring and a lower ring connected by one or more struts as well as a cover portion covering the structural ring portion and having an upper surface and a lower surface connected by an outer wall and an inner wall to form an enclosed space, the outer wall having an open or transparent portion to allow light to pass into the enclosed space, and the inner wall which extends circumferentially around a center axis to define a central opening and which includes an opening which extends circumferentially around the center axis. The device further includes a reflector disposed within the enclosed space and aligned with the open or transparent portion of the outer wall to reflect light passing therethrough as well as at least one diffuser disposed within the enclosed space for diffusing reflected light to illuminate a subject positioned within the central opening.

DETAILED DESCRIPTION

Referring to the drawings, there are shown light modifiers or "light modification devices" according to several embodiments. Although described herein in the singular, the present description will be understood to refer generally to all embodiments except where otherwise indicated. Discussion herein of features or functionality of any one embodiment disclosed herein should be understood by way of analogy to refer to features or functionality of any other embodiment except where otherwise indicated or apparent from the context.

Figure 1:
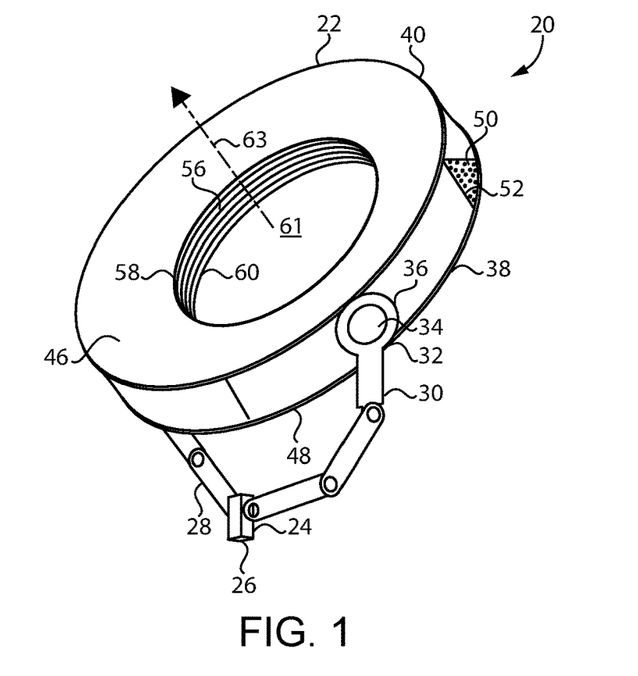
FIG. 1 is a perspective view of a light modification device according to one embodiment.
Figure 2:
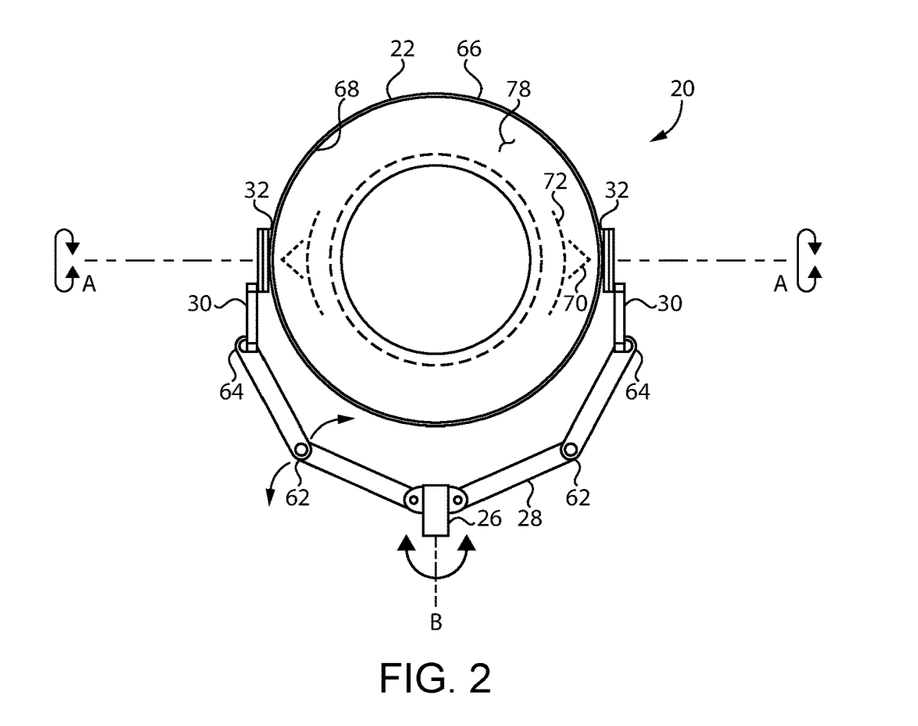
FIG. 2 is a plan view of a light modification device according to one embodiment.

FIG. 1 shows a perspective view of a light modification device according to one embodiment. In this particular embodiment, a light modification device 20 includes a ring portion 22 and a bracket portion 24. The bracket portion 24 includes a mounting fixture 26 which may be mounted to a bracket, armature, or similar structure so as to allow the light modification device 20 to be adjusted to and held in a desired position. Typically, the mounting fixture 26 is pivotable about an axis B as shown in FIG. 2. The bracket portion 24 further includes one or more adjustable extensions 28 which allow the position of the ring portion 22 relative to the mounting fixture 26 to be adjusted as desired. Adjustable extensions 28 may be mounted to one another at adjustable mounting points 62 which allow the position of brackets to be adjusted relative to one another as desired. The bracket portion 24 also includes two ring brackets 30 which allow the ring portion 22 to be pivotably mounted to the bracket portion 24. Each ring bracket 30 is mounted to an adjustable extension 28 at a mounting point 64 which allows the ring bracket 30 to be moved relative to the adjustable extension. Each ring bracket 30 includes a pivotable structure 32 to which the ring portion 22 is mounted and which allows the ring portion 22 to pivot about an axis A as shown in FIG. 2. Each ring bracket 30 further includes a flash mounting ring portion 36 to which a light source such as an automatic flash device (not shown) may be removably mounted and which surrounds an open (or possibly a transparent) center portion 34 through which light from a mounted light source may pass. Any suitable mounting mechanism may be used to mount a light source to the flash mounting ring portion 36 such as hook and loop style fabrics, mechanical brackets, straps (either fixed length or elastic), and the like. A suitable mounting mechanism will typically allow for a flash device to be quickly and easily secured to a mounting ring portion 36 when the device is in use and quickly and easily removed when not in use.

The ring portion 22 includes a first outer ring 38 and a second outer ring 40 which define an outer diameter for the ring portion 22 and are axially spaced apart by one or more struts 52 which define a height of the ring portion 22. Rings 38 and 40 may form a frame that supports the various walls, reflectors, diffusers, and other structures of ring portion 22 to be described, and all of which may be made of fabric or other flexible and deformable materials enabling the ring portion 22 to be collapsed. The ring portion 22 in this embodiment further includes a first inner ring 60 and a second inner ring 58 which define an inner diameter for the ring portion 22. The inner rings 60 and 58 may not be used in some embodiments. The exact size of the inner diameter, outer diameter, and height may vary across different embodiments and may be larger or smaller depending on the desired application. A central opening 61 is within ring portion 22 and extends axially therethrough to define a center axis 63. The rings 38, 40, 58, 60 and struts 52 may be made from any suitable material such as steel, aluminum, plastic, composites, and the like. A suitable material typically will be lightweight, sufficiently strong so as to hold its shape, and optionally flexible and resilient so as to return to a preformed circular shape, or another shape, when elastically deformed. In an embodiment, ring portion 22 can be collapsed axially by deforming, displacing, or removing struts 52, twisted and then folded upon itself to form a flattened shape that can be easily stored.

The various rings are covered with a flexible fabric material so as to form an upper surface 46 and a lower surface 48 connected by both an outer side surface 50 and an inner side surface 56 so as to form an annular or donut shaped structure. The inner side surface 56, first inner ring 60 and second inner ring 58 surround and define a staging area located at the center of the annular structure, within opening 61. The flexible fabric material may be made from any suitable material such as nylon, polyesters, cotton, and other natural or synthetic materials. Typically, suitable fabrics will be opaque or absorptive of light, lightweight, flexible, and durable. Typically the upper surface 46 and lower surface 48 are opaque and have a dark color such as black which will not reflect light nor bleed through. Outer side surface 50 is opaque and has a dark color such as black which will not reflect light nor bleed through. The fabric from which the upper, lower, and outer side surfaces is formed may itself be black, or coated, with inside surfaces being white or silver, for example, as further discussed below. Inner side surface 56 may have a window opening formed therein, as further described below, that extends circumferentially around center axis 63, with a translucent diffuser material radially outward of the window opening.

Figure 3:
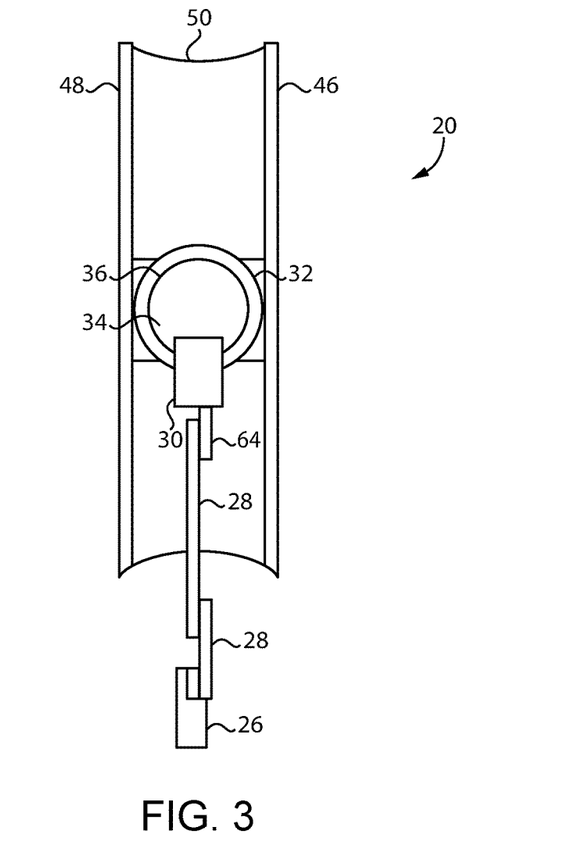
FIG. 3 is a side plan view of a light modification device according to one embodiment.
Figure 4:
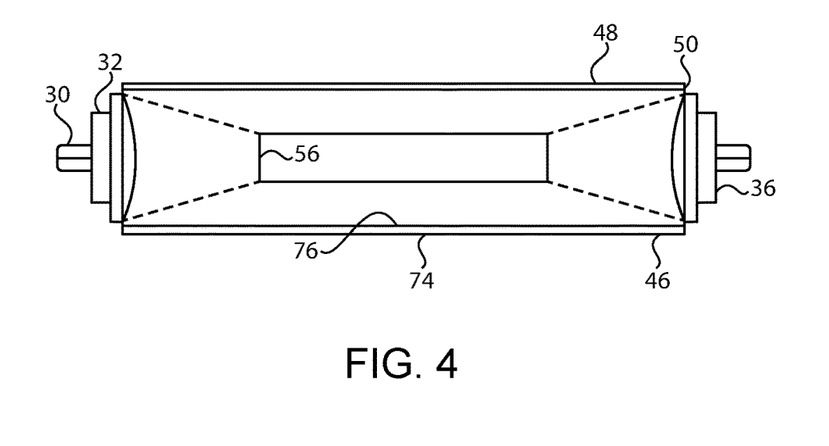
FIG. 4 is another side plan view of a light modification device according to one embodiment.

Continuing with FIGS. 2-4, the outer side surface 50 has an inner face 68 and an outer face 66. The inner face 68 has a color such as white or silver which is highly reflective of light. The outer face 66 may have a color which is minimally reflective of light such as black. Upper surface 46 and lower surface 48 also have an inner face 76 and an outer face 74. The inner face 76 has a color such as white or silver which is highly reflective of light. The outer face 74 has a color which is minimally reflective of light such as black. In this particular example the light modification device 20 further includes reflective structures 70, and a diffuser layer or structure 72 positioned within the enclosed space 78 formed by the upper surface 46, lower surface 48, outer side surface 50, and inner side surface 56. The reflective structure 70 and diffuser structure 72 are positioned relative to the open portion 34 of each ring bracket 30 such that light from a flash device strikes reflective structure 72 and reflects rather than passing directly through the enclosed space 78 from the flash device. Diffuser structure 72 may be one of multiple diffuser structures, radially spaced and extending circumferentially, or partially circumferentially, around enclosure 78 to diffuse light from a flash (or continuous light source such as LED lights within enclosure 78), which ultimately passes through a window opening in inner surface 56.

Figure 5:
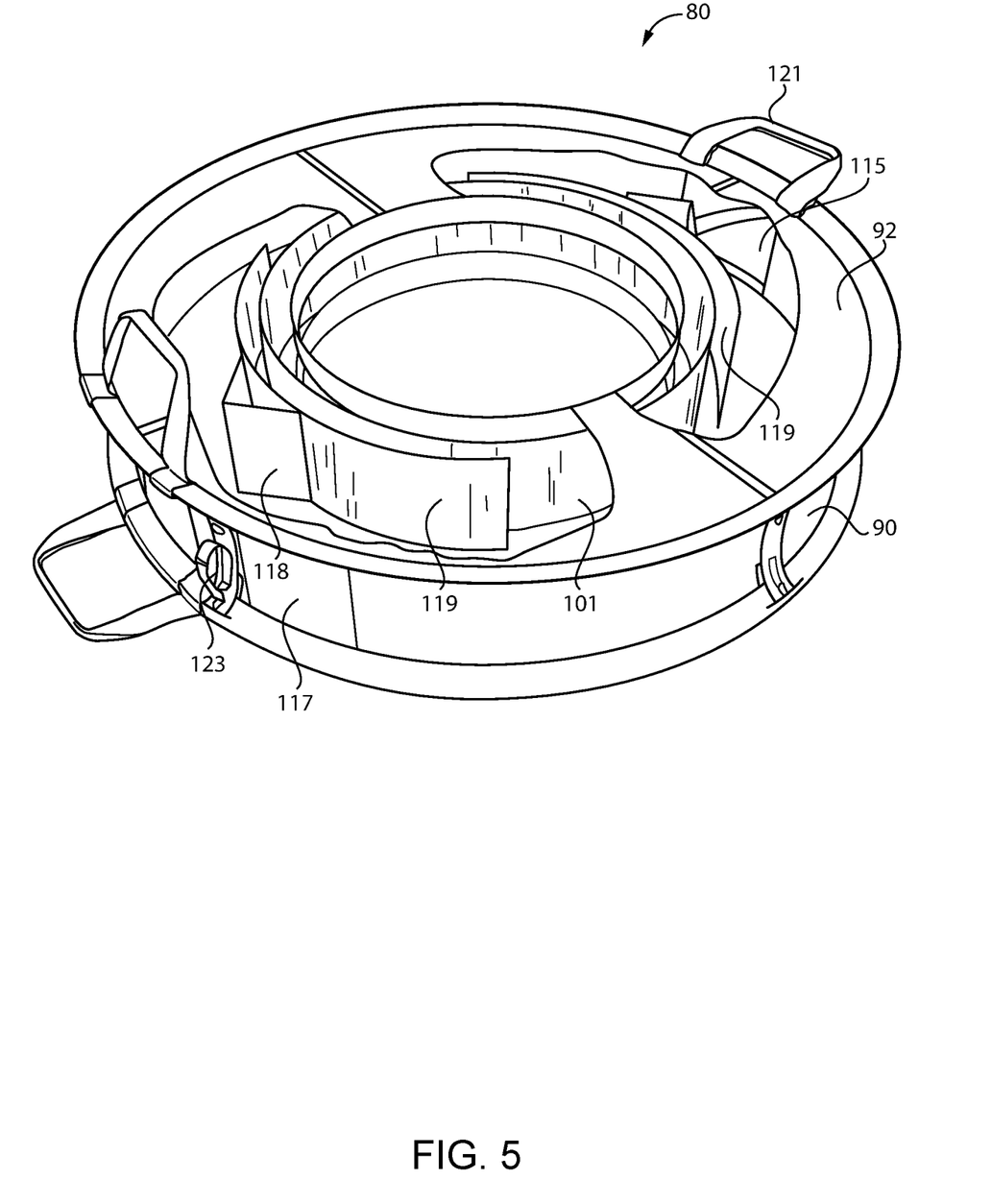
FIG. 5 is a partial cut away view of a light modification device according to one embodiment.
Figure 6:
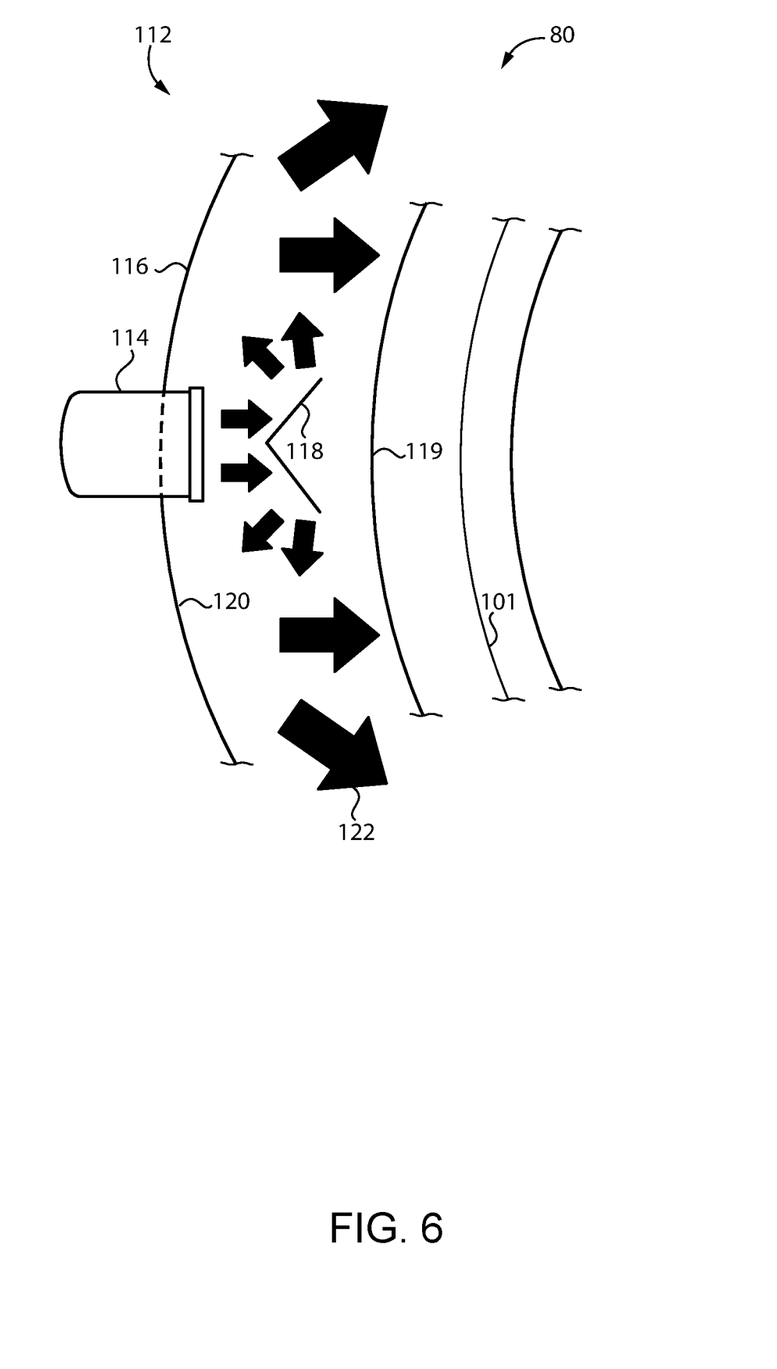
FIG. 6 is a functional diagrammatic view of a light modification device according to one embodiment.
Figure 7:
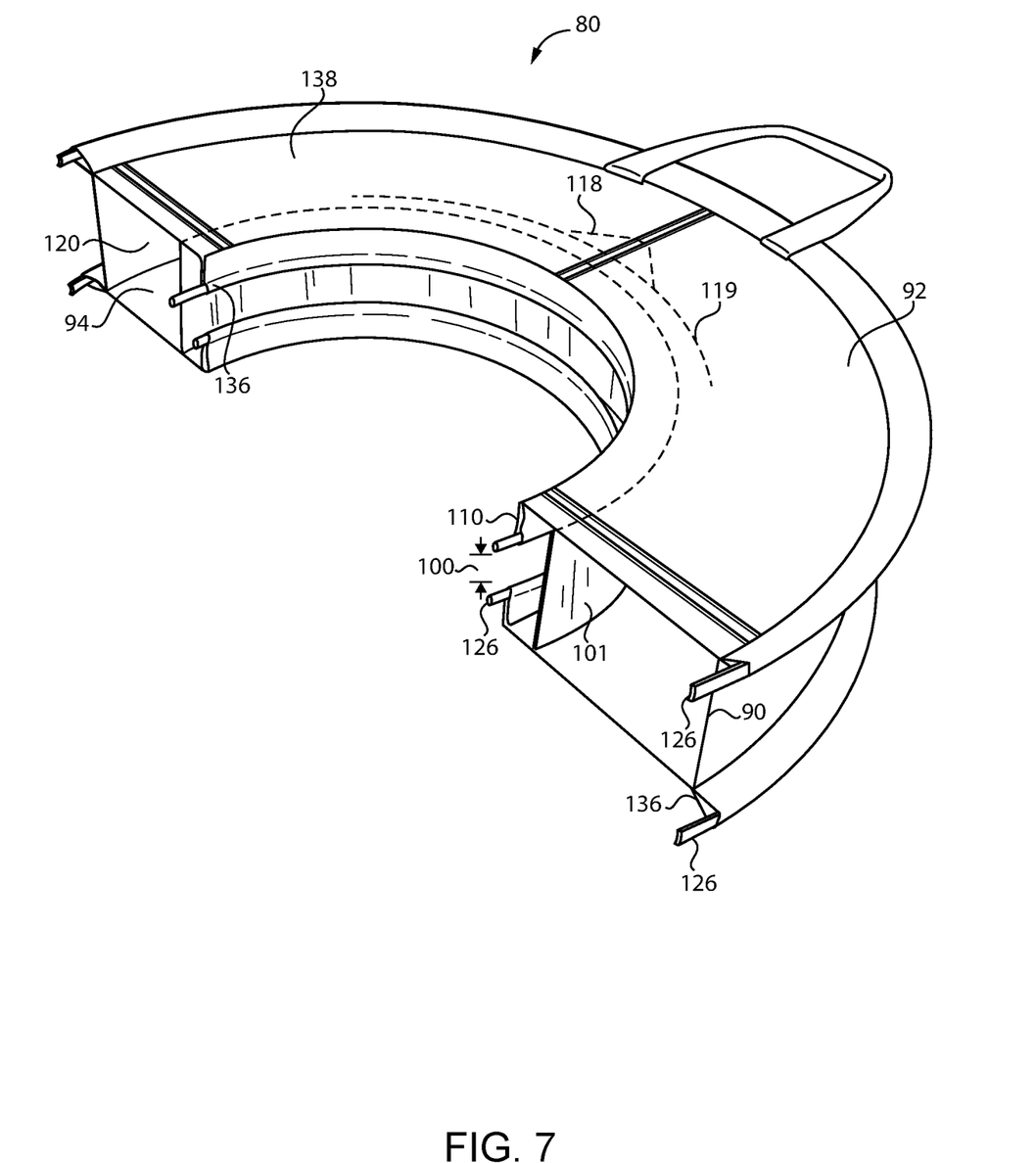
FIG. 7 is a partial cut away view of a light modification device according to one embodiment.

FIGS. 5-7. show partial cut away view of a light modification device 80 according to one embodiment of the disclosed invention. The light modification device 80 has an upper surface 92, a side surface 90, and a lower surface 94 which together form an outer cover or shell 138. A ring bracket 82 may be mounted to the side surface 90 of the device as previously described in reference to FIGS. 1-4. A flash device 84 is mounted to the ring bracket 82 using mounting straps 86 in this particular example, although other mounting methods may also be used. Side surface 90 includes a hole aligned with ring bracket 82 such that when mounted the flash device 84 protrudes therethrough and partially into the enclosure 106 formed by the upper surface 92, lower surface 94 and side surface 90. Typically such an opening is sized and configured such that no ambient light may pass therethrough when a flash device is mounted in the opening. A reflector is shown at 118. One or more diffuser layers are shown at 99, and a translucent layer at 101. A window opening at 100 in an inner wall 110 extends circumferentially around a center opening, as discussed above.

FIG. 6 shows a functional diagrammatic view of the light modification device 80. In this embodiment, a flash device 114 is mounted partially through an opening 115 in the outer wall 116 of the light modification device 80. The opening 115 may be selectively closed using a flap 117 which may be secured open or closed to the body of the light modification device 80. Optionally the light modification device 80 includes one or more carry handles 121. The outer wall 116 has a reflective inner surface 120 such that light striking it is directed back towards the interior of the device 112, and passes through a diffuser layer 119. Diffuser layer 99 could be one of any number of layers identical or different from one another. A translucent layer 101 is fully circumferential, whereas diffuser layer 119 may be only partially so. Deflection, scattering, and diffusion of light circumferentially around device 80 will result in a desired, uniform lighting of an object. Reflective structure 118 is positioned such that light 122 leaving the flash device 114 strikes it and is reflected towards the reflective inner surface 120. Such an arrangement causes light generated by the flash device to exit the light modification device 80 more uniformly rather than from a single source (e.g., a flash device), as suggested above.

FIG. 7 shows another partial cut away view of structures of light modification device 80. As can be seen the light modification device 80 includes a plurality of structural members 126 (generally ring shaped in this embodiment) which form a structural frame covered by an outer shell 138 and secured thereto by one or more support structures 136 such as fabric or material sewn into a channel or ring through which the structural member 126 passes. The outer shell 138 may be made from a flexible material which allows the light modification device 80 to be collapsed when not in use. Optionally, the light modification device 80 includes one or more securing members 123 which are adapted to secure the device 80 to a flash device or other light source.

Figure 8:
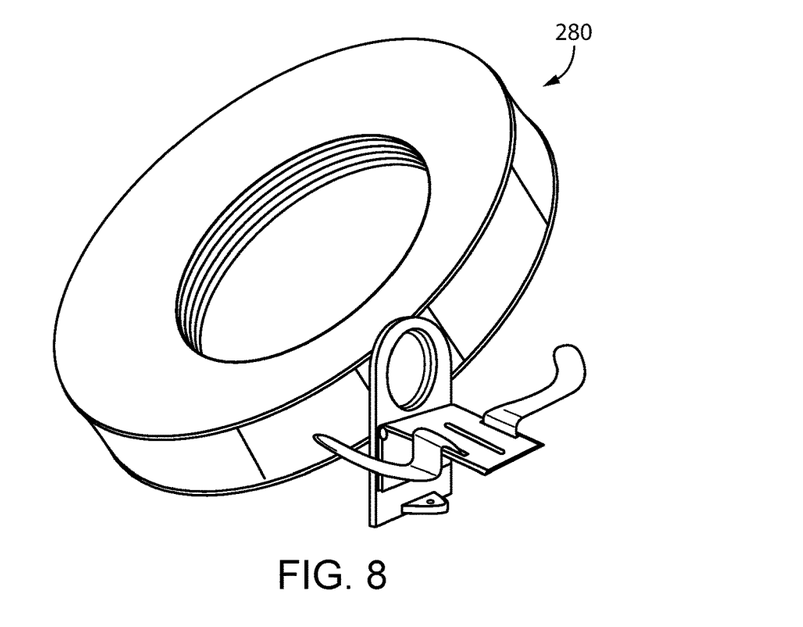
FIG. 8 is a perspective view of a light modification device, according to another embodiment.
Figure 9:
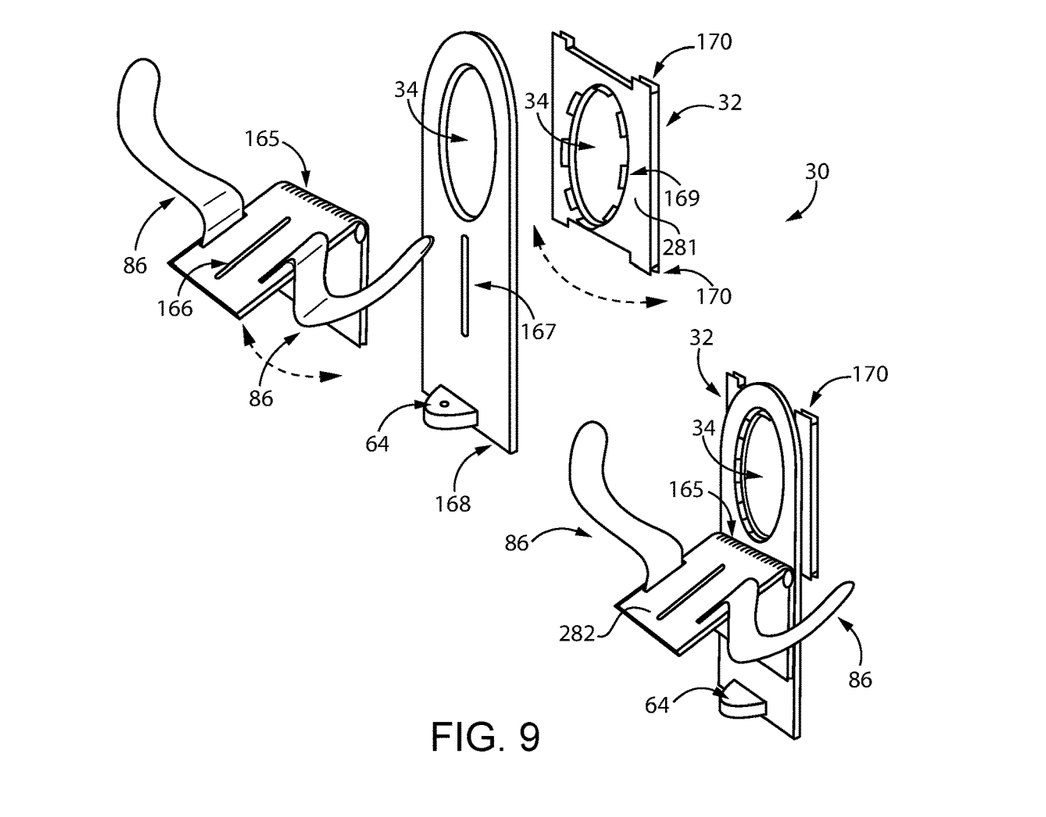
FIG. 9 is a disassembled view of mounting apparatus for a light modification device, according to one embodiment.

Referring now to FIGS. 8-9, there is shown a light modification device to 80 according to another embodiment. Light modification device 280 shares similarities with previously described embodiments, but has certain differences respecting certain structures, namely, flash mounting apparatus structures. Device 280 includes a ring bracket 30, a pivotable structure 32 having a strut 281, a flash harness connection plate 168, and a flash mount 282. Flash mount 282 is equipped with mounting straps 86, and is connectable to flash harness connection plate 168 by way of fasteners enabling pivoting. A pivot cleat is shown at 167. A mounting bolt slot 166 is formed in flash mount 282, and a locking hinge is shown at 165. Protruding pivot cleats 169 or the like may be positioned around an open portion 34 in strut 281. A mounting point is identified at 64. The various parts are assembled into a mounting structure whereby it can be understood that ring structure attachment cleats 170 formed on strut 281 engage with rings in a frame of light modification device 280. A user can mount a flash device to flash mount 282 securing the flash device with straps 86, for example, with strut 281 coupled with connection plate 168 and flash mount 282 coupled with connection plate 168. Connection plate 168 is thus pivotable at a point of connection with strut 281, and flash mount 282 can be pivoted into position and locked to orient the flash device to project light through open portions 34 in each of connection plate 168 and strut 281.

Figure 10:
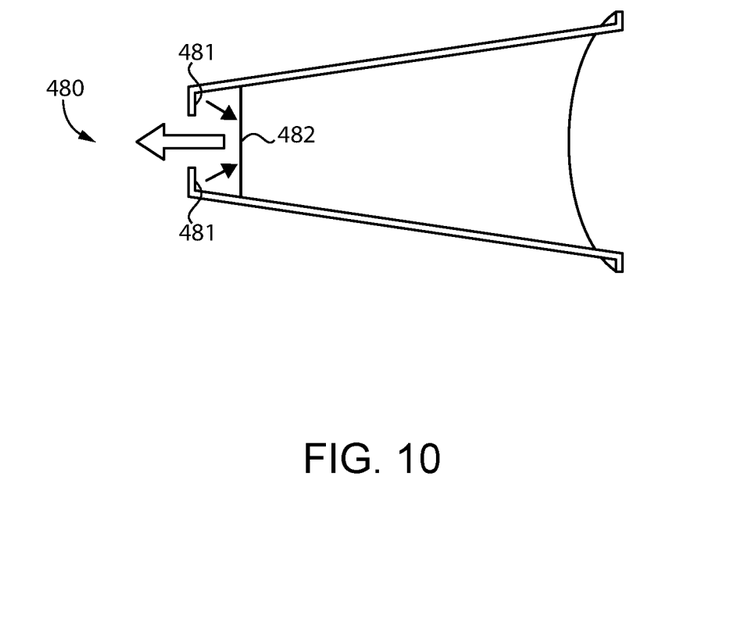
FIG. 10 is a partial cross-sectional view of a light modification device, according to yet another embodiment.

Referring now to FIG. 10, there is shown a light modification device 480 according to another embodiment and including structures and functionality similar to that of foregoing embodiments but certain differences. Light modification device 480 includes lighting apparatus (e.g. LED strips) that can be illuminated continuously, similar to that discussed in connection with other embodiments, but positioned radially inward of an internal wall of device 480, and structured to produce light that reflects off of a reflective and/or diffusive layer 482. It can be seen that emitted light of this nature can generally be oriented so to converge toward a center of a staging area where a subject can be placed. It will be appreciated that device 480 could also be used with flash devices. In this embodiment, various advantages may be observed respecting video filming. In other words, rather than a flash device for still photography device 480 may be equipped for both still photography by way of flash devices, and also for video by way of lights 481. The lights 481 could be constructed in strips which can be built-in to device 480 or releasably attached such as by hook and loop fasteners or other suitable means. In this embodiment the lights are inside the wall or lip with lights 481 aimed at the diffusion material. In another embodiment, such lights could be pointed directly at a stage or staging area within the center of device 480. Power for lights 381 can be provided using an electrical cable such as a USB battery or power supply or the like.

Figure 11:
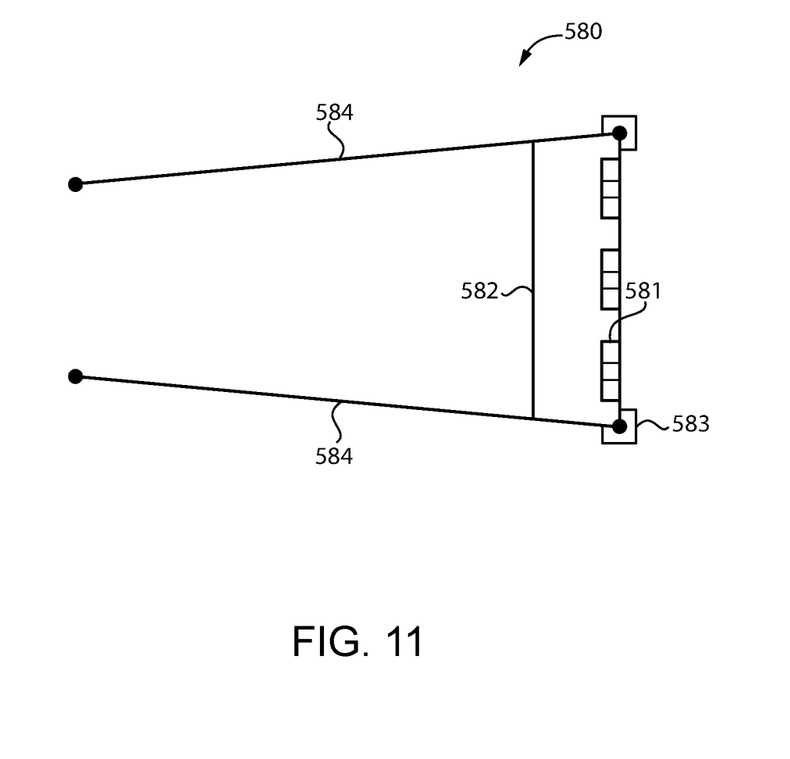
FIG. 11 shows a partial cross-sectional view of a light modification device, according to another embodiment.

Referring now to FIG. 11, there is shown a light modification device 580 according to another embodiment. Device 580 may positioned upon a stand and could be used for any photographic application, but may also be advantageously applied for video. Device 580 includes a plurality of LED strips 581 mounted to a flexible rectangular channel 583. Diffusion material 582 is placed directly in front of lights 581. Side members 584 form shutters that assist in keeping light from lights 581 focused narrowly toward a centrally located staging area. An outside circumference of channel 583 could be, or could include, spring steel to assist in forming a circle when in use. Optionally device 580 may include bolts, mounts, or other protrusions for pivotably mounting device 580 upon a stand. Any suitable mounting arrangement or apparatus including pegs, bolts, studs, openings, etc. could be used. Channel 583 can have a joint or break, enabling device 580 to be opened and coiled in a generally spiral form to collapse for storage.

Figure 12:
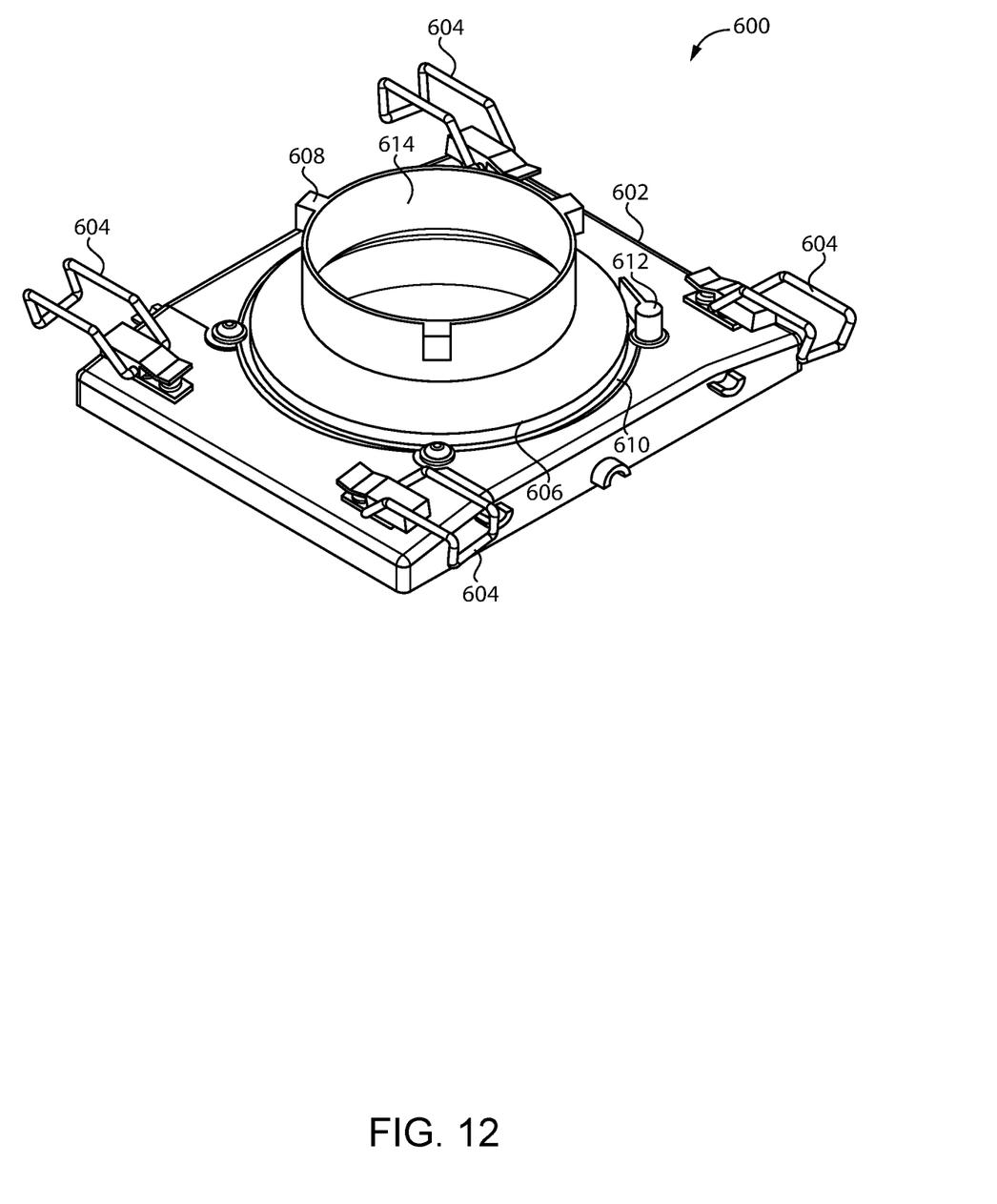
FIG. 12 is a perspective view of a flash mounting adapter for use with a light modification device according to one embodiment.

FIG. 12 is a perspective view of a flash mounting adapter 600 for use with one of the light modification devices disclosed herein. The mounting adapter 600 has a mounting plate portion 602 as well as a mounting hub portion 606. The mounting hub 606 is rotatably mounted to the plate portion 602 at a channel 610. Optionally the plate portion 602 further includes a locking cam 612 which is rotatable between a locked position (shown) and an unlocked position (not shown). When in the locking cam 612 is in unlocked position the mounting hub 606 may rotate freely within the channel 610. When in the locked position the mounting hub 606 is prevented from rotating within the channel 610.

The plate portion 602 further includes one or more securing latches 604. The securing latches are sized and configured such that they may latch to a ring member or structural member and secure the mounting adapter 600 to a light modification device such as disclosed herein. For example, the mounting adapter 600 may be positioned over the opening 34 of the light modification device 20 shown in FIG. 1 and the latches 604 latched to the ring 40 to secure the mounting adapter 600 to the light modification device 20. In another example, the mounting adapter 600 may be positioned over the opening 115 of the light modification device 80 shown in FIG. 5 and the latches 604 latched to the structural member 126 to secure the mounting adapter 600 to the light modification device 80. Once secured to a light modification device an electronic flash device (not shown) may be mounted to one or more mounting features 608 positioned on the mounting hub portion 606 such that the electronic flash device may project light through the open central portion 614 of the mounting adapter, though the opening/transparent portion of the light modification device, and into the enclosed body of the light modification device. The exact size, nature, and distribution of mounting features 608 may vary according to the electronic flash device being used, but would include such mounting features which are known and commonly used in the photographic industry. In another example, the mounting hub portion 606 is removable from the plate portion 602 such that different mounting hubs having different securing features may be used with a single plate portion.

INDUSTRIAL APPLICABILITY

As discussed above, existing techniques for properly lighting staged objects for photography or other artistic purposes are hampered by one or more of being overly complex, requiring expensive and specialized equipment, and/or providing limited control over the final result. The light modification devices disclosed herein may be used to provide a method of diffusing and shaping light from photographic flash lighting or continuous light to create a diffused 360 degree thin plane of light around a subject. This plane of light creates unique lighting conditions for photography that can accentuate raised textures and depth of a subject without casting hard shadows with minimal light seepage outside of the plane.

A light shaping device such as those described above may include a mounting bracket portion connected pivotably connected to a ring portion which encompasses a staging area. In such embodiments a mounting bracket portion may be operationally mounted to an armature which allows for several degrees of movement in the X, Y, and Z axes. In other examples the mounting bracket portion is instead mounted to a pole, tripod, wall bracket, or other device. The armature is securely mounted at one end to a table or other staging area for the object to be illuminated. In other examples the armature may be mounted to a tripod, wall, pole, or other structure. In still other examples, a light shaping device such as those disclosed herein may be simply held by an assistant or assistants depending on the size of the device. To achieve the desired lighting effect the light shaping device is maneuvered and positioned such that the subject of the photograph is disposed within the staging area by adjusting the position of the light shaping device wither by moving the armature and/or mounting bracket portion (if used) or by moving the light shaping device directly.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A light shaping device, comprising:
a ring portion having a first wall and a second wall joined by an inner wall and an outer wall each extending circumferentially around a center axis, and the first, second, inner, and outer walls forming an enclosed space, and a central opening extends axially through the ring portion;
at least one open or transparent portion in the outer wall for admitting light from flash devices to the enclosed space;
reflectors within the enclosed space and each in alignment with the at least one open or transparent portions to reflect admitted light for dispersal about the enclosed space;
at least one diffuser within the enclosed space for diffusing reflected light; and
a wall opening is formed in the inner wall and extends circumferentially around the center axis permitting diffused light from the ring portion to illuminate a subject positioned within the central opening of the ring portion.

2. The light shaping device of claim 1, wherein the ring portion is collapsible.

3. The light shaping device of claim 2, wherein:
the ring portion includes a spring frame having an upper ring and a lower ring;
at least one strut coupled between the upper ring and the lower ring to support the ring portion in an expanded configuration; and
wherein the at least one strut can be removed or displaced to permit axially collapsing the ring portion.

4. The light shaping device of claim 1, wherein the first wall, second wall, and outer wall each have an inner surface and an outer surface and wherein the inner surfaces are reflective and the outer surfaces are absorptive.

5. The light shaping device of claim 1, wherein the ring portion is pivotably mounted to a mounting structure.

6. The light shaping device of claim 1, wherein the open or transparent portions include two open portions positioned at opposite locations upon the outer wall, and the reflectors include two reflectors positioned in the enclosed space in alignment with the two open portions.

7. The light shaping device of claim 6 wherein the at least one diffuser is fully circumferential of the central axis and positioned radially outward of the window opening.

8. The light shaping device of claim 7 wherein the at least one diffuser includes a flexible diffuser layer extending axially between the first wall and the second wall.

9. The light shaping device of claim 8 further comprising another diffuser positioned radially between the at least one diffuser and the reflectors.

10. A light shaping device, comprising:
a ring portion having a first wall and a second wall joined by an inner wall and an outer wall to enclose a space, wherein the first wall, second wall, and outer wall are opaque, and a translucent layer extends circumferentially around a center axis of the ring portion at a location that is radially inward of the outer wall;

two mounting structures having open or transparent portions, wherein one side of each mounting structure is mounted to the outer wall of the ring portion and the other side of each mounting structure includes a structure for mounting a flash device thereto;

wherein the open or transparent portions of each mounting structure is mounted to the ring portion at an opening in the outer wall;

wherein a window opening in the inner wall extends circumferentially around the center axis.

11. The light shaping device of with claim 10, wherein a translucent diffuser layer is positioned radially inward of the window opening.

12. A light shaping device, comprising:
- a structural ring portion having an upper ring and a lower ring connected by one or more struts;
- a cover portion covering the structural ring portion and having an upper surface and a lower surface connected by an outer wall and an inner wall to form an enclosed space, the outer wall having an open portion to allow light to pass into the enclosed space, and the inner wall which extends circumferentially around a center axis to define a central opening and which includes an opening which extends circumferentially around the center axis;
- a reflector disposed within the enclosed space and aligned with the open portion of the outer wall to reflect light passing therethrough;
- at least one diffuser disposed within the enclosed space for diffusing reflected light to illuminate a subject positioned within the central opening.

13. The light shaping device of claim 12, wherein the one or more struts are displaceable such that the device is collapsible.

14. The light shaping device of claim 12, wherein the structural ring portion further includes an inner upper ring portion and an inner lower ring portion operationally attached to the inner wall of the cover portion.

15. The light shaping device of claim 12, wherein the upper and lower surface and inner and outer wall each have an inner surface and an outer surface and wherein the inner surfaces are reflective and the outer surfaces are opaque.

16. The light shaping device of claim 12, wherein the outer wall includes a second open portion, the open portions positioned at opposite locations upon the outer wall, and a second reflector positioned in the enclosed space in alignment with the second open or transparent portion.

17. The light shaping device of claim 16 wherein the at least one diffuser is fully circumferential of the central axis and positioned radially outward of the inner wall opening.

18. The light shaping device of claim 12 wherein the at least one diffuser is a flexible diffuser layer extending axially between the outer wall and the inner wall.

19. The light shaping device of claim 12, further comprising at least one light source disposed within the enclosed space.

20. The light shaping device of claim 19, wherein the at least one light source comprises a plurality of LED devices.

\* \* \* \* \*